(12) United States Patent  
Mosquera et al.

(10) Patent No.: US 9,195,373 B2  
(45) Date of Patent: Nov. 24, 2015

(54) SYSTEM AND METHOD FOR NAVIGATION IN AN ELECTRONIC DOCUMENT

(75) Inventors: Luis Daniel Mosquera, Foster City, CA (US); Matthew Pallakoff, Mountain View, CA (US)

(73) Assignee: NOOK DIGITAL, LLC, New York, NY (US)

(*) Notice: Subject to any disclaimer, the term of this patent is extended or adjusted under 35 U.S.C. 154(b) by 196 days.

(21) Appl. No.: 13/598,749

(22) Filed: Aug. 30, 2012

(65) Prior Publication Data

US 2013/0055140 A1   Feb. 28, 2013

Related U.S. Application Data

(60) Provisional application No. 61/529,120, filed on Aug. 30, 2011.

(51) Int. Cl.
*G06F 3/0483* (2013.01)
*G06F 3/0488* (2013.01)

(52) U.S. Cl.
CPC .......... *G06F 3/0483* (2013.01); *G06F 3/04883* (2013.01); *G06F 2203/04808* (2013.01)

(58) Field of Classification Search
CPC . G06F 3/0483; G06F 3/04883; G06F 3/0488; G09G 2380/14
USPC ........................................................ 715/776
See application file for complete search history.

(56) References Cited

U.S. PATENT DOCUMENTS

| | | | |
|---|---|---|---|
| 8,624,851 B2 * | 1/2014 | Kim et al. .................... | 345/173 |
| 2002/0034296 A1 * | 3/2002 | Yoshimune et al. ......... | 380/239 |
| 2004/0085364 A1 * | 5/2004 | Keely et al. .................. | 345/804 |
| 2008/0163379 A1 | 7/2008 | Robinson et al. | |
| 2008/0168073 A1 * | 7/2008 | Siegel et al. ................. | 707/100 |
| 2008/0168404 A1 | 7/2008 | Ording | |
| 2009/0239202 A1 | 9/2009 | Stone | |
| 2010/0309147 A1 * | 12/2010 | Fleizach et al. .............. | 345/173 |
| 2011/0154268 A1 | 6/2011 | Trent, Jr. et al. | |
| 2011/0310005 A1 * | 12/2011 | Chen et al. ................... | 345/156 |
| 2012/0023462 A1 * | 1/2012 | Rosing et al. ................ | 715/863 |
| 2012/0102424 A1 * | 4/2012 | Chong et al. ................. | 715/776 |
| 2012/0221972 A1 * | 8/2012 | Patterson et al. ............ | 715/810 |
| 2013/0298067 A1 * | 11/2013 | Parker et al. ................. | 715/776 |

FOREIGN PATENT DOCUMENTS

CN           101044071 A       9/2007

\* cited by examiner

*Primary Examiner* — Omar Abdul-Ali
(74) *Attorney, Agent, or Firm* — Winston & Strawn LLP (57) ABSTRACT

A system and a method facilitating navigation in an electronic device and for enabling users of electronic devices to navigate quickly, smoothly, and naturally through electronic books and other documents using multi-touch gestures on a touch sensitive surface of the electronic device. The multi-touch gestures are movements of the multiple touches such as, preferably, a two-finger slide or flick gesture. This gesture is interpreted by the system as a command to navigate to the next or to a previous section of the electronic document, for example, the next chapter in a book or an article or section in a magazine. The device has firmware and/or software capable of analyzing and interpreting the motion, and forwarding the analyzed contents or interpretation to an appropriate software application or other software subsystem that associates the gestures with a set of commands.

32 Claims, 7 Drawing Sheets

SYSTEM AND METHOD FOR NAVIGATION IN AN ELECTRONIC DOCUMENT

CROSS-REFERENCE TO RELATED APPLICATION

This application claims benefit of U.S. Provisional Application No. 61/529,120, filed Aug. 30, 2011, which is hereby incorporated by reference.

FIELD OF THE INVENTION

The present invention generally relates to systems and methods for using a touch surface on an electronic device, and more particularly to systems and methods for detecting and interpreting gestures on a touch screen and performing operations based on the gestures.

BACKGROUND OF THE INVENTION

Figure 1:
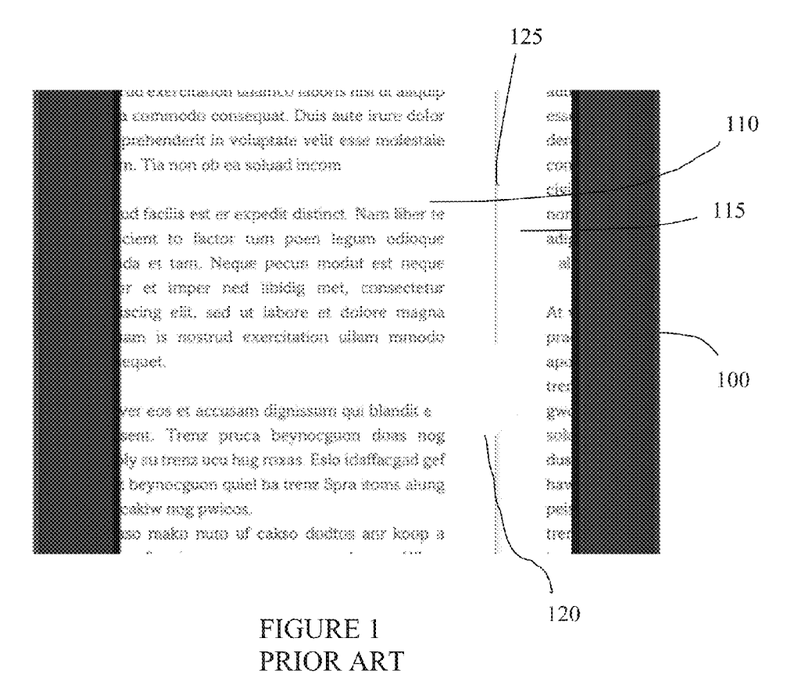
FIG. 1 illustrates a conventional single finger gesture for turning a single page in an electronic document.

In general, gestures that a user makes on a touch screen of an electronic device, e.g., an electronic device for reading electronic publications, are intended to cause some sort of action with respect to the content being displayed on the device. For example, FIG. 1 illustrates an e-Book reader 100 displaying the pages 110, 115 of an electronic book. In the example illustrated in FIG. 1, the user wants to turn the page 110 of the content of the e-Book in order to read the second page 115. Circle 120 represents the touch of a single finger of the user on the touch screen of the device 100. In order to turn the page 110, the user swipes (flips) her finger 120 in the direction she wants the page to turn, much like with a physical book. Note that the divider 125 between two pages 110, 115 is displayed as being relatively thin, representing a single page being turned.

Multi-touch refers to device's ability to detect and interpret two or more simultaneous touches on a touch sensing surface, e.g., a trackpad or touchscreen. Multi-touch is used to implement advanced functionality such as pinch to zoom or activating predefined actions/functions.

SUMMARY OF THE INVENTION

The present invention provides multi-touch user-interface (UI) gestures designed to enable users of electronic devices to navigate quickly, smoothly, and naturally through electronic publications, e.g., electronic books, magazines, newspapers and other electronic documents. In a preferred embodiment, the touch sensing surface is a touch-screen and a two-finger slide or flick gesture is employed by the user on the touch screen to navigate, flip, to the next or previous section of the electronic document, e.g., a chapter in a book or an article or section in a magazine.

In addition to a touch-sensitive screen, any device capable of executing the computer operations associated with the present invention is equipped with hardware, firmware and/or software capable of detecting a user touching the device at one or more contact points, and moving in potential multiplicity of directions in a simple motion. The device also has firmware and/or software capable of analyzing and interpreting the motion, and forwarding the analyzed contents or interpretation to an appropriate software application or other software subsystem that associates the gestures with a set of commands.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 2:
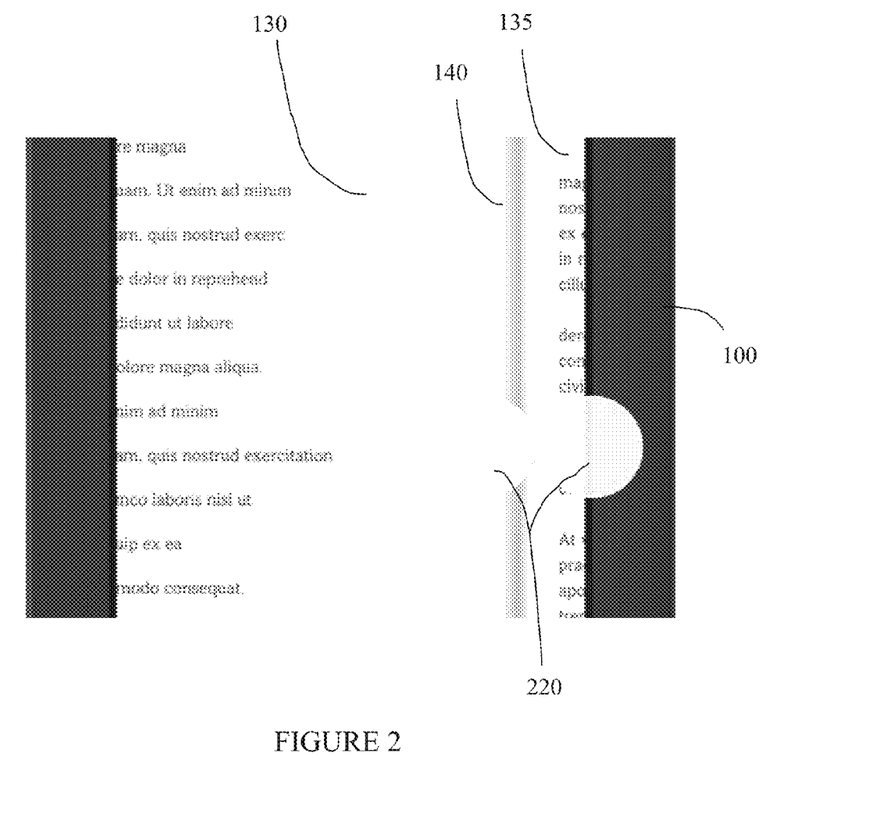
FIG. 2 depicts a two finger gesture for going to the next chapter/article in the electronic document.
Figure 3:
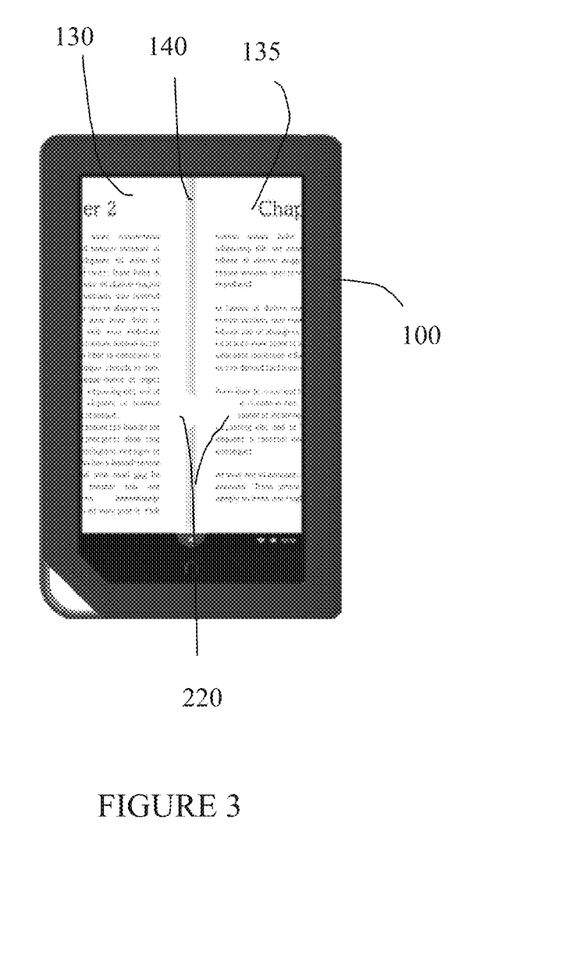
FIG. 3 illustrates a further embodiment of a two finger gesture for advancing to the next chapter/article in the electronic document.

FIGS. 2 and 3 illustrate a two finger gesture example of the present invention. In the e-Book embodiment of the present invention, the two finger gesture is interpreted to mean that the user wants to flip to the next section of the book, e.g., the next chapter. Similarly, in the embodiment of a periodical, e.g., a magazine, the two finger gesture is interpreted such that the periodical skips to the next section in the periodical, e.g., the next article in a magazine, or for periodicals that have well defined sections, such as "new fiction," "poetry," "movies," etc. One skilled in the art understands that "sections" as used herein refers to the logical portions or segments contained in an electronic document. The locations, positions and formatting of the sections are typically defined by the publisher of the electronic publication and are included in the file constituting the electronic publication.

As illustrated in these Figures, the user places two of her fingers 220 on the touch screen of the device 100. The user's fingers start on a page 130 of the current chapter she is viewing and swipes to the left to "turn" the e-Book to the first page 135 of the next chapter. Note that the divider 140 between two pages 130, 135, of the two chapters is displayed as being composed of several pages, representing the turn of multiple pages in the remaining chapter. As is readily appreciated by those skilled in the art, the same general concepts as illustrated in this embodiment of an e-book apply equally to other embodiments, such as a periodical (e.g., magazine or newspaper).

It is preferred to let users "undo" the consequences of a flip gesture simply by flipping in the reverse direction. Again, a similar motion and consequence as when a user navigates in a physical book. In a preferred embodiment, if the user flips N pages in one direction, the opposite motion would flip N pages in the reverse direction, and the user winds up back on the page where she started.

Support for this 'undo' behavior in the case of a two-finger swipe can be accomplished several ways. For example, any time a user starts a two-finger chapter flip, the device can record the current book position P and the current chapter C. A two-finger flip LEFT takes the user to the start of the NEXT chapter C+1, or to an end-of-book page if there are no more chapters.

A two-finger flip RIGHT takes the user to (a) the start of the CURRENT chapter C if the reader is not already at the start of the current chapter; or (b) to the start of the PREVIOUS chapter C−1 if the reader is already on the first page at the start of the current chapter.

In any sequence of two-finger flips, using any combination of left or right two-finger flips, any time a user transitions from C to C+1 or vice versa, the system preferably makes an additional stop at position P, i.e., the user's position prior to starting the sequence of flips, if P is not the same position as C or C+1. If the user does any page change other than a two-finger flip, e.g. a single-finger page change, use the TOC, etc., then that is the end of the two-finger chapter flip sequence and P is updated to the new page. This will let the user easily get back to his current position, even if he starts quickly two-finger-flipping through the chapters.

Figure 4:
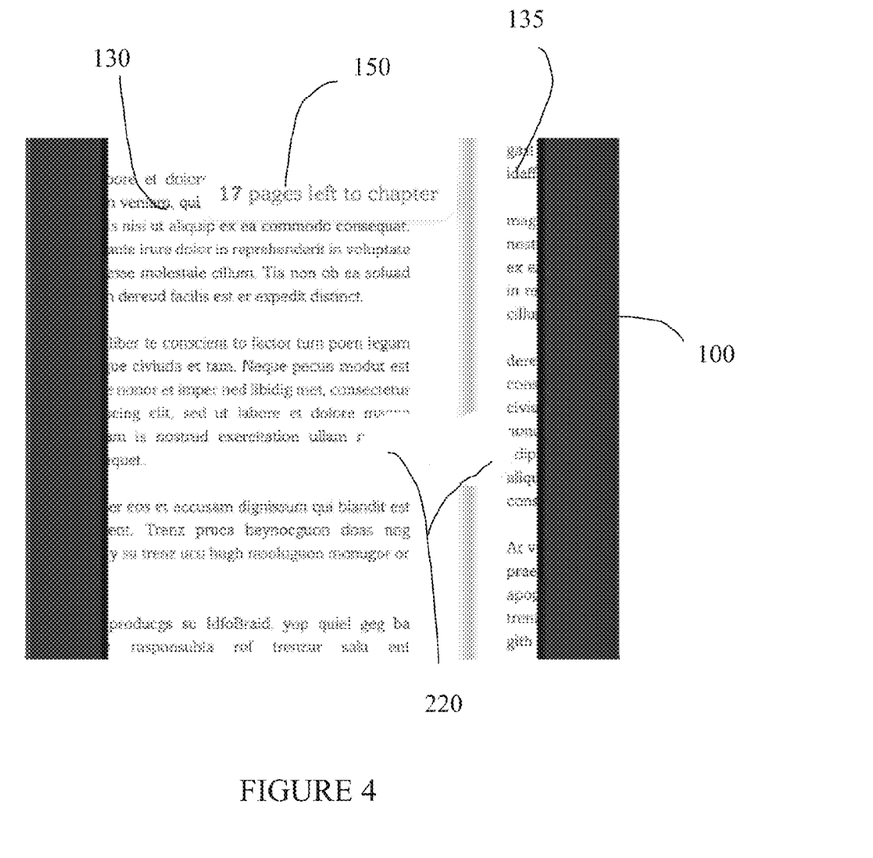
FIG. 4 illustrates a further embodiment of a two finger gesture for advancing to the next chapter/article in the electronic document.

FIG. 4 illustrates an embodiment of the present invention which displays to the user the number of pages left in the chapter when/if she starts a two finger chapter turn. As illustrated in this Figure, as the user begins her two finger chapter swipe, a pop-up box 150 appears which contains the number of pages left in the chapter.

Figure 5:
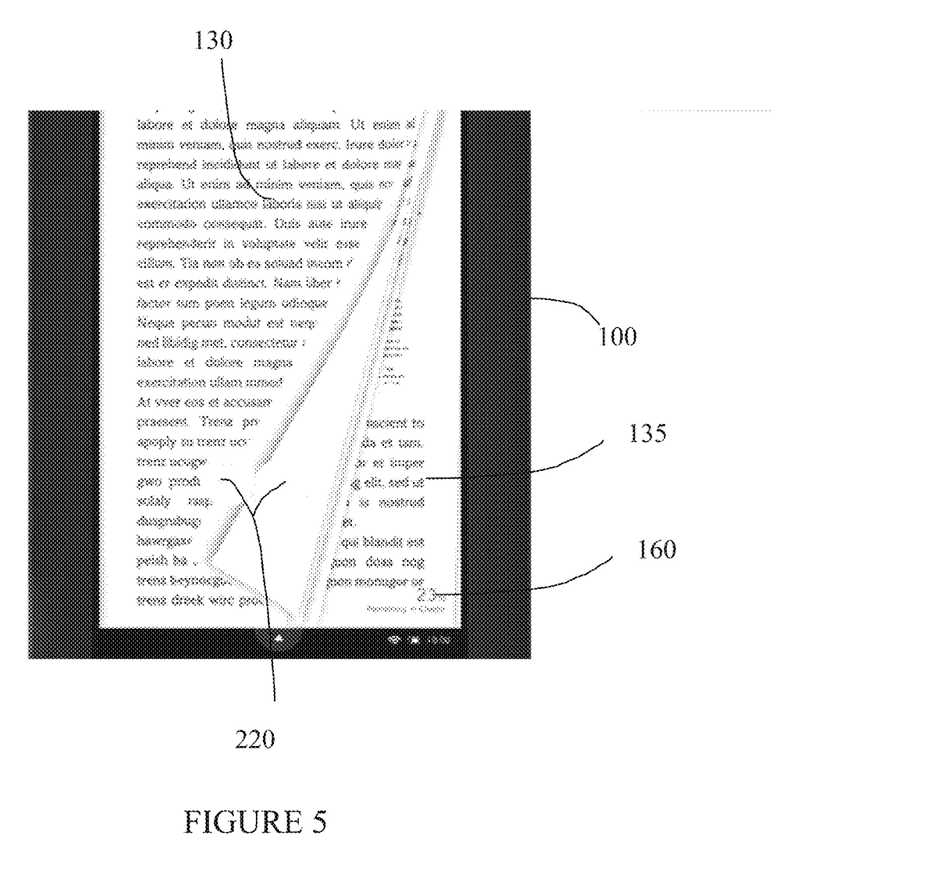
FIG. 5 depicts a further embodiment of a two finger gesture for advancing to the next chapter/article in the electronic document.

FIG. 5 illustrates an alternative embodiment for displaying to the user the number of pages remaining in the present chapter. As depicted in this Figure, when the user starts a two finger chapter flip forward from a page 130 in the current chapter, the 'pages remaining' indicator 160 is printed in the lower right margin of the page 135 of the next chapter being uncovered. It should also be noted that FIG. 5 illustrates an embodiment of the present invention in which the pages being turned are animated in a 'curl' fashion, as could be seen with the pages of a physical book.

In one embodiment, the text 160 can be formatted in two lines as illustrated in FIG. 5, right aligned with right margin of text on page. In this embodiment, the user can read the whole indicator 160 without having to slide very far to reveal the indicator 160.

In a preferred embodiment, even a very short two-finger fling should flip the chapter, just as a very short one-finger fling flips the page. The system of the present invention supports a "fall back" if user slides short distances, stops, and releases the pages in the chapter. In this case, the pages simply fall-back and the user remains on her currently viewed page. In a preferred embodiment, if the slide distance is less than a threshold value, the page falls-back to its original position.

While a two-finger slide or fling moving substantially horizontally is the preferred gesture for flipping to the next or previous chapter, alternative embodiments include the use of two or more fingers, e.g., three fingers. Still other embodiments could interpret different gestures as chapter flips, such as a vertical swipe or a circular swipe using one or more fingers. As described above, the system just has to be informed as to what commands to associate with detected gestures.

Figure 6:
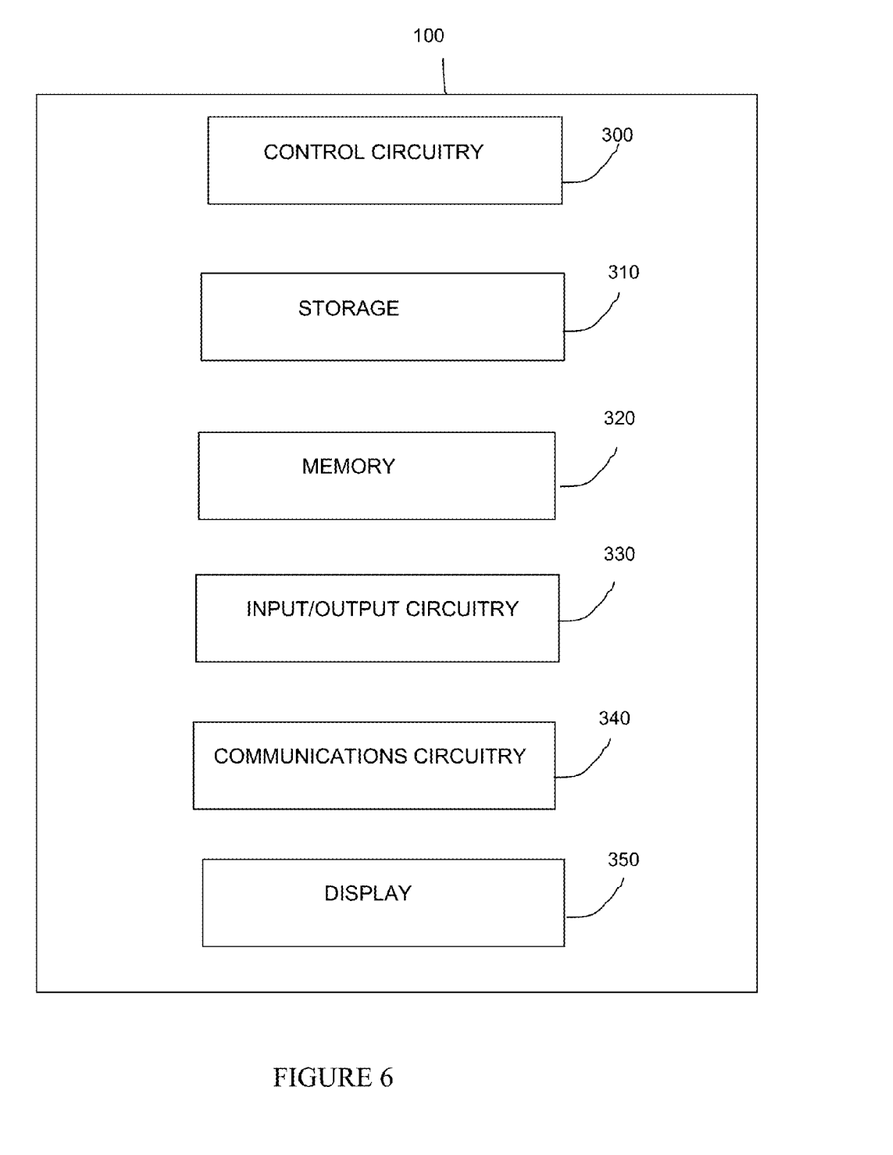
FIG. 6 illustrates an electronic device incorporating the present invention.

FIG. 6 illustrates an exemplary device 100 for operating the present invention. As appreciated by those skilled the art, the device 100 can take many forms capable of operating the present invention. In a preferred embodiment the device 100 is a mobile electronic device, and in an even more preferred embodiment device 100 is an electronic reader device. Electronic device 100 can include control circuitry 300, storage 310, memory 320, input/output ("I/O") circuitry 330, communications circuitry 340, and display 350. In some embodiments, one or more of the components of electronic device 100 can be combined or omitted, e.g., storage 310 and memory 320 may be combined. As appreciated by those skilled in the art, electronic device 100 can include other components not combined or included in those shown in this Figure, e.g., a power supply such as a battery.

Electronic device 100 can include any suitable type of electronic device. For example, electronic device 100 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 100 can include a larger portable electronic device, such as a laptop computer. As yet another example, electronic device 100 can include a substantially fixed electronic device, such as a desktop computer.

Control circuitry 300 can include any processing circuitry or processor operative to control the operations and performance of electronic device 100. For example, control circuitry 300 can be used to run operating system applications, firmware applications, media playback applications, media editing applications, or any other application. Control circuitry 300 can drive the display 350 and process inputs received from a user interface, e.g., the touch screen portion of display 350.

Storage 310 can include, for example, one or more non-transitory computer readable storage mediums including a hard-drive, solid state drive, flash memory, permanent memory such as ROM, magnetic, optical, semiconductor, paper, or any other suitable type of storage component, or any combination thereof. Storage 310 can store, for example, media content, e.g., eBooks, music and video files, application data, e.g., software for implementing functions on electronic device 100, firmware, user preference information data, e.g., content preferences, authentication information, e.g., libraries of data associated with authorized users, transaction information data, e.g., information such as credit card information, wireless connection information data, e.g., information that can enable electronic device 100 to establish a wireless connection, subscription information data, e.g., information that keeps track of podcasts or television shows or other media a user subscribes to, contact information data, e.g., telephone numbers and email addresses, calendar information data, and any other suitable data or any combination thereof. The instructions for implementing the functions of the present invention may, as non-limiting examples, comprise software and/or scripts stored in the computer-readable media 310.

Memory 320 can include cache memory, semi-permanent memory such as RAM, and/or one or more different types of memory used for temporarily storing data. In some embodiments, memory 320 can also be used for storing data used to operate electronic device applications, or any other type of data that can be stored in storage 310. In some embodiments, memory 320 and storage 310 can be combined as a single storage medium.

I/O circuitry 330 can be operative to convert, and encode/decode, if necessary analog signals and other signals into digital data. In some embodiments, I/O circuitry 330 can also convert digital data into any other type of signal, and vice-versa. For example, I/O circuitry 330 can receive and convert physical contact inputs, e.g., from a multi-touch screen, i.e., display 350, physical movements, e.g., from a mouse or sensor, analog audio signals, e.g., from a microphone, or any other input. The digital data can be provided to and received from control circuitry 300, storage 310, and memory 320, or any other component of electronic device 100. Although I/O circuitry 330 is illustrated in this Figure as a single component of electronic device 100, several instances of I/O circuitry 330 can be included in electronic device 100.

Electronic device 100 can include any suitable interface or component for allowing a user to provide inputs to I/O circuitry 330. For example, electronic device 100 can include any suitable input mechanism, such as a button, keypad, dial, a click wheel, touchpad, or a touch screen, e.g., display 350.

In some embodiments, electronic device 100 can include specialized output circuitry associated with output devices such as, for example, one or more audio outputs. The audio output can include one or more speakers, e.g., mono or stereo speakers, built into electronic device 100, or an audio component that is remotely coupled to electronic device 100, e.g., a headset, headphones or earbuds that can be coupled to device 100 with a wire or wirelessly.

Display 350 includes the display and display circuitry for providing a display visible to the user. For example, the display circuitry can include a screen, e.g., an LCD screen, which is incorporated in electronics device 100. In some embodiments, the display circuitry can include a coder/decoder (Codec) to convert digital media data into analog signals. For example, the display circuitry or other appropriate circuitry within electronic device 100 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 100, information regarding ongoing communications operations, information regarding incoming communications requests, or device operation screens, under the direction of control circuitry 300. Alternatively, the display circuitry can be operative to provide instructions to a remote display.

Communications circuitry 340 can include any suitable communications circuitry operative to connect to a communications network and to transmit communications, e.g., data from electronic device 100 to other devices within the communications network. Communications circuitry 340 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 100 can include one more instances of communications circuitry 340 for simultaneously performing several communications operations using different communications networks, although only one is shown in this Figure to avoid overcomplicating the drawing. For example, electronic device 100 can include a first instance of communications circuitry 340 for communicating over a cellular network, and a second instance of communications circuitry 340 for communicating over Wi-Fi or using Bluetooth. In some embodiments, the same instance of communications circuitry 340 can be operative to provide for communications over several communications networks.

In some embodiments, electronic device 100 can be coupled to a host device such as remote servers for data transfers, synching the communications device, software or firmware updates, providing performance information to a remote source, e.g., providing reading characteristics to a remote server, or performing any other suitable operation that can require electronic device 100 to be coupled to a host device. Several electronic devices 100 can be coupled to a single host device using the host device as a server. Alternatively or additionally, electronic device 100 can be coupled to several host devices, e.g., for each of the plurality of the host devices to serve as a backup for data stored in electronic device 100.

Figure 7:
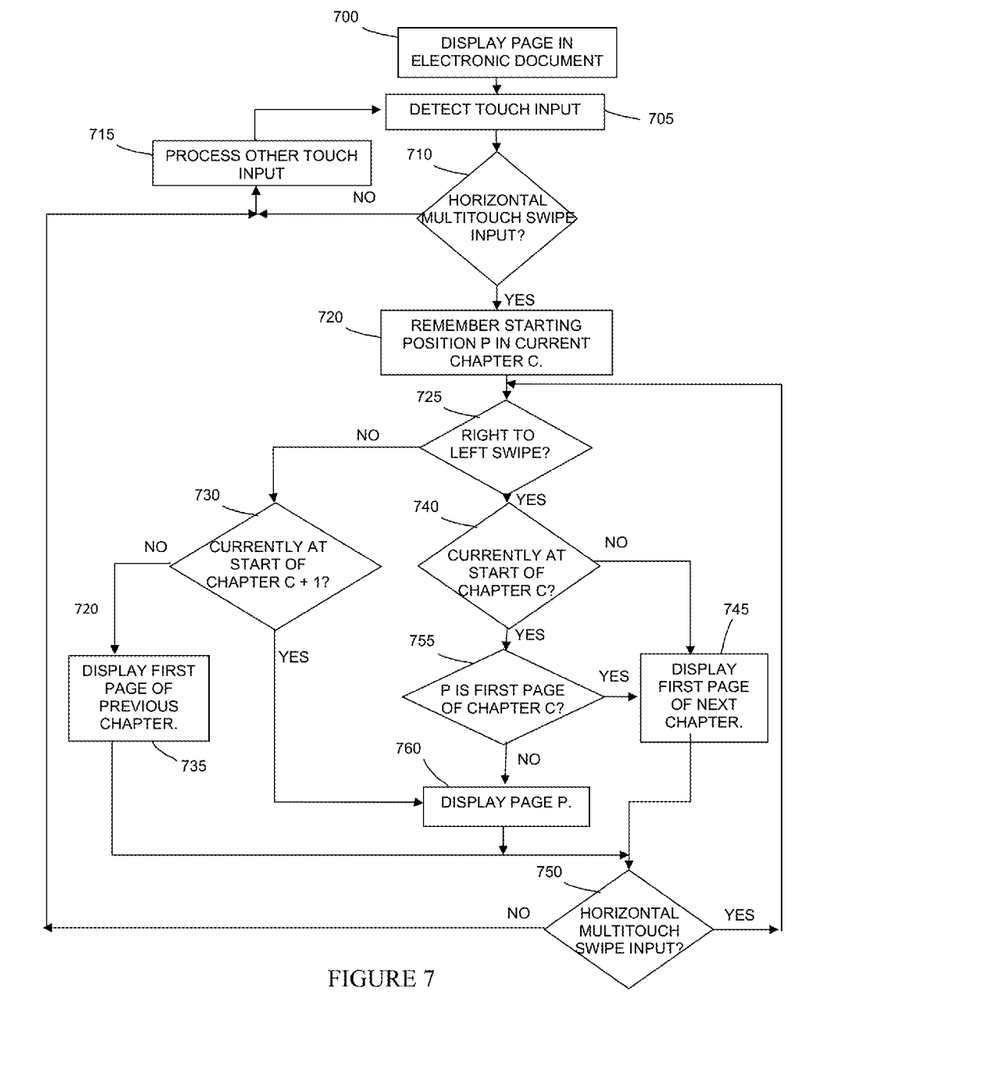
FIG. 7 is flow chart illustrating a preferred method of the present invention.

FIG. 7 is flow chart illustrating a preferred method of the present invention. In act 705, a page or a portion of a page (e.g., on a smaller display device) in an electronic document is displayed. In act 705, the system detects a touch input by a user. The touch input is tested in act 710 to see if it is a horizontal multi-touch input. As described above, in the preferred embodiment, the navigation gestures are preferably to left to right and right to left horizontal swipes or flips. The navigation gestures are preferably horizontal because other types (directions, taps . . . ) of multi-touch gestures are reserved for other commands. Gestures that are substantially horizontal are accepted as horizontal navigation gestures. If the touch input is not interpreted as a horizontal navigation gesture, the non-navigation gesture is processed in act 715 and the process returns to act 705 to monitor for additional touch input. Although not shown in FIG. 7, the processing in act 715 can result in exiting the navigation process, state machine, illustrated in FIG. 7. For example, the user could press a button that closes/exits the electronic document. Alternatively, the processing at in act 715 could result in a new page being displayed before new touch input. For example, the user could bring up a list of bookmarks and jump to somewhere else in the electronic document.

In act 720, the system stores the user's current reading position in the electronic publication, namely the current page P and the current section, e.g., chapter C. As described above, although the preferred embodiment described herein is in relation to electronic books, those skilled in the art appreciate that the present invention is applicable to all type of electronic publications with defined sections such as electronic newspapers or electronic magazines.

In act 725, it is determined if the gesture was a left to right gesture or a right to left gesture. If it was a left to right gesture, the system in act 730 determines if the current position is at the start of chapter C+1. If it is not, the system, in response to the left to right swipe, displays the first page of the previous chapter in act 735. In an alternative embodiment, if the current chapter is chapter C, the system can display the first page in the current chapter. The embodiment allows the user to quickly move to the beginning of the current chapter. This option can be programmed by the designer of the system or can be a option given to the user. In either embodiment, after the display of the desired page, the system moves to act 750 to detect and interpret additional swipes.

The reference to "previous chapter" in act 735 and "next chapter" in act 745 do not necessarily refer to chapters C−1 and C+1. These references are to the previous or next chapter relative to wherever the user happens to be in a sequence of chapter flips. As described below in connection with acts 740-760, the system preferably makes a special case stop at page P when flipping backwards from chapter C+1 or flipping forward from chapter C. In the case where the user is flipping backwards from chapter C+1, the system simply jump to position P in chapter C, which may or may not be at the start of that chapter C. In the case of flipping forward from chapter C, the system stops at the original page P, if P isn't at the start of chapter C.

In act 730, if the current location is the start of chapter C+1, the system responds to the left to right swipe as a command to undo the previous navigation and displays the starting page P in act 760. After this display, the system moves to step 750 to detect and interpret additional swipes.

Returning to act 725, if it is determined that the gesture was a right to left swipe, the system in act 740 determines if the current position is at the start of chapter C+1. If it is not, the system interprets the gesture as a command to navigate to the next chapter and in act 745 the system displays the first page in the next section of the electronic document. After this display, the system moves to step 750 to detect and interpret additional swipes.

Returning to the decision in act 740, if the current position is at the start of chapter C, the system then determines in act 755 if P was the first page of chapter C. If it was, the system interprets the gesture as a command to move to the next chapter and in act 745, the system displays the first page in the next section of the electronic document. After this display, the system moves to step 750 to detect and interpret additional swipes. In decision 755, if P was not the first page in chapter C, the system interprets the right to left gesture as a command to return to the original page P and displays this page P in act 760. After this display, the system moves to step 750 to detect and interpret additional swipes.

In act 750, the system is looking for additional navigation commands. As described above, this feature of the present invention allows the user to perform several consecutive swipes to navigate through the document sections (e.g., chapters) at a time. It also allows the user to undo these navigations by performing the opposite gesture. As previously described, in the preferred embodiment, the system allows the user to navigate easily and quickly back the starting page P. This navigation feature allows the user to quickly swipe through articles in magazine or newspaper or chapters in a book, while effectively holding their place at the current reading position.

In act 750, additional touch gestures are detected and acted on. If the additional gesture is not a horizontal navigation gesture, the system processes the other types of touch in act 715 and returns to looking for touch inputs in act 705. If the additional gesture is determined in act 750 to be a navigation gesture, the system returns to the decision in act 725. This loop enables the user to perform the quick scanning of other sections as described above, while the user's current page and chapter are remembered and can be returned to.

Described above are some optional processes not illustrated in FIG. 7, such as displaying the pages remaining in the section or document when performing the navigation and animating the navigation.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A method for navigating in an electronic book comprising:
    displaying at least a portion of a current page in a current chapter of the electronic book on a display screen of an electronic device;
    storing a position of the current page as P and the current chapter as C in a memory of the electronic device.
    detecting simultaneous multiple touches on a touch sensitive surface of the electronic device;
    detecting a gesture comprised of the movement of the simultaneous multiple touches;
    interpreting the detected gesture as a command to navigate to a different page of the electronic book, the different page being more than one page away from the current page P if P is more than one page away from a beginning or end of the current chapter C; and
    displaying at least a portion of the different page of the electronic book in response to the detection and interpretation of the gesture.

2. The method according to claim 1, wherein the act of detecting simultaneous multiple touches further comprises detecting a simultaneous two finger touch by the user.

3. The method according to claim 1, wherein the act of detecting the gesture further comprises detecting a left to right swipe of the simultaneous multiple touches.

4. The method according to claim 3, wherein the act of interpreting the detected gesture further comprises interpreting the detected gesture as a command by the user to navigate to a first page of the current chapter C of the electronic book.

5. The method according to claim 3, wherein the act of interpreting the detected gesture further comprises interpreting the detected gesture as a command by the user to navigate to a previous chapter C−1 of the electronic book.

6. The method according to claim 1, wherein the act of detecting the gesture further comprises detecting a right to left swipe of the simultaneous multiple touches.

7. The method according to claim 6, wherein the act of interpreting the detected gesture further comprises interpreting the detected gesture as a command to navigate to a next chapter C+1 of the electronic book.

8. The method according to claim 1, further comprising displaying a number of pages remaining in the current chapter of the electronic book.

9. The method according to claim 8, wherein the act of displaying the number of pages remaining in the current chapter C of the electronic book further comprises displaying the number of pages remaining in a pop-up box on the display screen of the electronic device.

10. The method according to claim 8, wherein the act of displaying the number of pages remaining in the current chapter C of the electronic book further comprises displaying the number of pages remaining in a lower right hand margin of the display screen of the electronic device.

11. The method according to claim 1, further comprising animating a turning of multiple pages in the electronic book in response to the interpretation of the detected gesture.

12. The method according to claim 1, further comprising:
    determining if the detected gesture is a right to left or left to right swipe of the simultaneous multiple touches;
    if the detected gesture is a right to left swipe, the act of interpreting the detected gesture comprises interpreting the detected gesture as a command to navigate to a next chapter C+1 of the electronic book, and wherein the act of displaying at least a portion of the different page comprises displaying at least a portion of a first page in chapter C+1; and
    if the detected gesture is a left to right swipe, the act of interpreting the detected gesture comprises interpreting the detected gesture as a command to navigate to a previous chapter C−1 of the electronic book, and wherein the act of displaying at least a portion of the different page comprises displaying at least a portion of a first page in chapter C−1.

13. The method according to claim 12, wherein the detected gesture is a first gesture in a first direction, the method further comprising:
    detecting a second gesture comprised of movement of further simultaneous multiple touches after displaying the at least a portion of the different page, the second gesture being in a second direction that is opposite from the first direction;
    interpreting the detected second gesture as a command to undo the navigation to the different page; and
    displaying at least a portion of the current page P in the current chapter C of the electronic book in response to the detection and interpretation of the second gesture.

14. The method according to claim 12, wherein the detected gesture is a first gesture in a first direction, the method further comprising:
- detecting n gestures comprised of movement of further simultaneous multiple touches after displaying the at least a portion of the different page, the n gestures being in the first direction;
- interpreting the detected n gestures as commands to navigate to chapter C−n if the first direction is left to right, and displaying at least a portion of a first page in the chapter C−n of the electronic book in response to the detection and interpretation of the n gestures; and
- interpreting the detected n gestures as commands to navigate to chapter C+n if the first direction is right to left, and displaying at least a portion of a first page in the chapter C+n of the electronic book in response to the detection and interpretation of the n gestures.

15. The method according to claim 14, further comprising:
- after detecting the n gestures in the first direction, detecting n gestures in a second direction that is opposite the first direction;
- displaying at least a portion of the current page P in the current chapter C of the electronic book in response to the detection of the n gestures in the second direction.

16. A non-transitory computer-readable media comprising a plurality of instructions that, when executed by at least one electronic device, cause the at least one electronic device to:
- display at least a portion of current page in a current chapter of an electronic book on a display;
- store a position of the current page as P and the current chapter as C in a memory of the electronic device;
- detect, through input received from a touch sensitive input device, simultaneous multiple touches by a user;
- detect, through input received from the touch sensitive input device, a gesture comprised of movement of the simultaneous multiple touches;
- interpret the detected gesture as a command to navigate to a different page of the electronic book, the different page being more than one page away from the current page P if P is more than one page away from a beginning or end of the current chapter C; and
- display, on the display, at least a portion of a first page of the electronic book in response to the detection and interpretation of the gesture.

17. An electronic device comprising:
- a memory that includes instructions for operating the electronic device and includes at least one electronic book that is capable of being displayed on the electronic device;
- a display;
- a touch sensitive input device; and
- control circuitry coupled to the memory, coupled to the touch sensitive input device and coupled to the display, the control circuitry executing the instructions and is operable to:
- display at least a portion of a current page in a current chapter of the electronic book on the display;
- store a position of the current page as P and the current chapter as C in the memory of the electronic device;
- detect, through input received from the touch sensitive input device, simultaneous multiple touches;
- detect, through input receive from the touch sensitive input device, a gesture comprised of movement of the simultaneous multiple touches;
- interpret the detected gesture as a command to navigate to a different page of the electronic book, the different page being more than one page away from the current page P if P is more than one page away from a beginning or end of the current chapter C; and
- display, on the display, at least a portion of the different page of the electronic book in response to the detection and interpretation of the gesture.

18. The electronic device according to claim 17, wherein the touch sensitive input device detects a simultaneous two finger touch by the user.

19. The electronic device according to claim 17, wherein the touch sensitive input device detects a left to right swipe of the simultaneous multiple touches by the user.

20. The electronic device according to claim 19, wherein the control circuitry interprets the detected gesture as a command to navigate to a first page of the current chapter C of the electronic book.

21. The electronic device according to claim 19, wherein the control circuitry interprets the detected gesture as a command to navigate to a previous chapter C−1 of the electronic book.

22. The electronic device according to claim 17, wherein the touch sensitive input device detects a right to left swipe of the simultaneous multiple touches.

23. The electronic device according to claim 22, wherein the control circuitry interprets the detected gesture as a command to navigate to a next chapter C+1 of the electronic book.

24. The electronic device according to claim 17, wherein the control circuitry displays a number of pages remaining in current chapter C of the electronic book.

25. The electronic device according to claim 24, wherein the control circuitry displays the number of pages remaining in a pop-up box on the display screen of the electronic device.

26. The electronic device according to claim 24, wherein control circuitry displays the number of pages remaining in a lower right hand margin of the display screen of the electronic device.

27. The electronic device according to claim 17, wherein control circuitry animates a turning of multiple pages in the electronic book in response to the interpretation of the detected gesture.

28. The electronic device according to claim 17, the control circuitry is further operable to:
- determine if the detected gesture is a right to left or left to right swipe of the simultaneous multiple touches;
- if the detected gesture is a right to left swipe, the act of interpreting the detected gesture further comprises interpreting the detected gesture as a command to navigate to a next chapter C+1 of the electronic book, and wherein the act of displaying at least a portion of the different page comprises displaying at least a portion of a first page in chapter C+1; and
- if the detected gesture is a left to right swipe, the act of interpreting the detected gesture comprises interpreting the detected gesture as a command to navigate to a previous chapter C−1 of the electronic book, and wherein the act of displaying at least a portion of the different page comprises displaying at least a portion of a first page in chapter C−1.

29. The electronic device according to claim 28, wherein the detected gesture is a first gesture in first direction, the control circuitry is further operable to:
- detecting n gestures comprised of movement of further simultaneous multiple touches after displaying the at least a portion of the different page, the n gestures being in the first direction;
- interpreting the detected n gestures as commands to navigate to chapter C−n if the first direction is left to right, and displaying at least a portion of a first page in the chapter C−n of the electronic book in response to the detection and interpretation of the n gestures; and interpreting the detected n gestures as commands to navigate to chapter C+n if the first direction is right to left, and displaying at least a portion of a first page in the chapter C+n of the electronic book in response to the detection and interpretation of the n gestures.

30. The electronic device according to claim 29, the control circuitry is further operable to:

after detecting the n gestures in the first direction, detect n gestures in a second direction that is opposite the first direction;

display at least a portion of the current page P in the first chapter C of the electronic book in response to the detection of the n gestures in the second direction.

31. The non-transitory computer-readable media according to claim 16, wherein the detected gesture is a first gesture in a first direction, wherein the plurality of instructions, when executed by at least one electronic device, further cause the at least one electronic device to:

detect, through input received from the touch sensitive input device, a second gesture comprised of movement of the simultaneous multiple touches after displaying the at least a portion of the different page, the second gesture being in an opposite direction from the first direction;

interpret the detected second gesture as a command by the user to undo the navigation to the different page; and display, on the display, the at least a portion of the current page P in the current chapter C of the electronic book in response to the detection and interpretation of the second gesture.

32. The electronic device according to claim 17, wherein the detected gesture is a first gesture in a first direction, and wherein the control circuitry executing the instructions and is further operable to:

detect, through input received from the touch sensitive input device, a second gesture comprised of movement of the simultaneous multiple touches after displaying the at least a portion of the different page, the second gesture being in an opposite direction from the first direction;

interpret the detected second gesture as a command by the user to undo the navigation to the different page; and display, on the display, the at least a portion of the current page P in the current chapter C of the electronic book in response to the detection and interpretation of the second gesture.

\* \* \* \* \*